US010368061B2

(12) United States Patent
Colosimo

(10) Patent No.: US 10,368,061 B2
(45) Date of Patent: Jul. 30, 2019

(54) METHOD AND APPARATUS FOR HOLOGRAPHIC IMAGE PROJECTION

(71) Applicant: BAE Systems plc, London (GB)

(72) Inventor: Nicholas Giacomo Robert Colosimo, Preston (GB)

(73) Assignee: BAE Systems plc, London (GB)

(*) Notice: Subject to any disclaimer, the term of this patent is extended or adjusted under 35 U.S.C. 154(b) by 16 days.

(21) Appl. No.: 15/564,445

(22) PCT Filed: Apr. 11, 2016

(86) PCT No.: PCT/GB2016/051003
§ 371 (c)(1),
(2) Date: Oct. 5, 2017

(87) PCT Pub. No.: WO2016/162696
PCT Pub. Date: Oct. 13, 2016

(65) Prior Publication Data
US 2018/0084244 A1 Mar. 22, 2018

(30) Foreign Application Priority Data

Apr. 10, 2015 (EP) ..................................... 15275116
Apr. 10, 2015 (GB) ................................... 1506085.8

(51) Int. Cl.
H04N 13/39 (2018.01)
G02B 27/22 (2018.01)
(Continued)

(52) U.S. Cl.
CPC ......... H04N 13/39 (2018.05); G02B 27/2292 (2013.01); G03B 21/60 (2013.01);
(Continued)

(58) Field of Classification Search
CPC .... H04N 13/39; H04N 9/3129; H04N 9/3161; G03B 35/00; G03B 21/608; G03B 21/60; G02B 27/2292
See application file for complete search history.

(56) References Cited

U.S. PATENT DOCUMENTS 4,686,605 A 8/1987 Eastlund
4,999,637 A 3/1991 Bass
(Continued)

FOREIGN PATENT DOCUMENTS

DE 10245682 A1 4/2004
WO 9428361 A1 12/1994
(Continued)

OTHER PUBLICATIONS

International Preliminary Report on Patentability of Internatinal Application No. PCTGB2016050948, dated Oct. 10, 2017, 8 pages.
(Continued)

Primary Examiner — Joseph Suh
(74) Attorney, Agent, or Firm — Maine Cernota & Rardin

(57) ABSTRACT

An apparatus comprising an electromagnetic radiation source communicably coupled to a control system and a three dimensional (3D) image projector for outputting a plurality of image signals representative of a subject, the control system being configured to cause electromagnetic radiation to be applied to a plurality of sets of selected three-dimensional portions of a gaseous volume so as to heat and/or ionize the gas within selected portions, wherein each set of selected three-dimensional portions of gaseous volume intersects a path of a respective one of image signals, and wherein selected portions of each of set are spatially located together in a substantially unbroken three-dimensional configuration and selectable orientated and configured to simulate an electromagnetic radiation path modify-
(Continued)

ing element for directing a respective image signals incident thereon to a selected location within a viewing region.

15 Claims, 7 Drawing Sheets

(51) Int. Cl.
*G03B 21/60* (2014.01)
*G03B 21/608* (2014.01)
*H04N 9/31* (2006.01)
*G03B 35/00* (2006.01)

(52) U.S. Cl.
CPC .......... *G03B 21/608* (2013.01); *G03B 35/00* (2013.01); *H04N 9/3129* (2013.01); *H04N 9/3161* (2013.01)

(56) References Cited

U.S. PATENT DOCUMENTS

| | | | |
|---|---|---|---|
| 5,041,834 A | 8/1991 | Koert | |
| 5,269,288 A | 12/1993 | Stirbl et al. | |
| 5,415,156 A | 5/1995 | Stirbl et al. | |
| 5,593,549 A | 1/1997 | Stirbl et al. | |
| 5,684,621 A * | 11/1997 | Downing | G02B 27/2271 |
| | | | 359/326 |
| 8,981,261 B1 | 3/2015 | Tillotson | |
| 2004/0135744 A1 | 7/2004 | Bimber | |
| 2009/0009862 A1 | 1/2009 | Hong | |
| 2009/0171477 A1 | 7/2009 | Nayfeh et al. | |
| 2010/0258708 A1 | 10/2010 | Meyers et al. | |
| 2011/0001429 A1* | 1/2011 | Davis | H04N 13/049 |
| | | | 315/111.21 |
| 2011/0121158 A1 | 5/2011 | Corke et al. | |
| 2014/0224776 A1* | 8/2014 | Elhadj | B81C 1/00523 |
| | | | 219/121.41 |
| 2014/0327747 A1* | 11/2014 | Kong | G02B 27/2292 |
| | | | 348/51 |
| 2017/0118545 A1* | 4/2017 | Kuri | H04J 14/02 |
| 2017/0212602 A1* | 7/2017 | Hsu | G06F 3/017 |
| 2018/0128908 A1 | 5/2018 | Blanchard | |

FOREIGN PATENT DOCUMENTS

| | | |
|---|---|---|
| WO | 2002056111 A1 | 7/2002 |
| WO | 2011057342 A1 | 5/2011 |
| WO | 2011063407 A2 | 5/2011 |
| WO | 2013039465 A1 | 3/2013 |

OTHER PUBLICATIONS

International Search Report and Written Opinion of International Application No. PCT/GB2016/050948, dated Jun. 2, 2016, 12 pages.
European Search Report of European Application No. EP15275113, dated Sep. 18, 2015, 6 pages.
Great Britain Search Report of Great Britain Application No. GB1506079.1, dated Oct. 5, 2015, 3 pages.
"Atmospheric lensing. A Weapon of Selective Destruction" by Steven J. Smith, Nov. 29, 2010. https://web.archive.org/web/20101129164210/http://whale.to/b/atmospheric_lensing.html, accessed on Mar. 10, 2015.
"Can we use atmospheric lenses as telescopes?" online discussion, last comment Oct. 30, 2014, http://www.thenakedscientists.com/forum/index.php?topic=52568.0, accessed on Mar. 10, 2015.
International Search Report and Written Opinion of International Application No. PCT/GB2016/050967, dated Jun. 1, 2016, 13 pages.

Brian W. Neiswander et al: "Plasma Lens for Optical Path Difference Control", AIAA Journal, vol. 50, No. 1, Jan. 1, 2012, pp. 123-130, XP055212822.
Bejot P et al: "32TW atmospheric white-light laser", Applied Physics Letters, American Institute of Physics, vol. 90, No. 15, Apr. 10, 2007, pp. 151106-151106.
Great Britain Search Report of Great Britain Application No. GB1506081.7, dated Oct. 8, 2015, 3 pages.
European Search Report of European Application No. EP15275114, dated Sep. 17, 2015, 8 pages.
International Search Report and Written Opinion of International Application No. PCT/GB2016/050984, dated Jun. 8, 2016, 15 pages.
Anonymous: "Plasma stealth—Wikipedia, the free encyclopedia", Mar. 21, 2015, XP055245259, Retrieved from the Internet: https//en.wikipedia.org/wiki/Plasma_stealth.
Bhaskar Chaudhury et al: "Stidy and Optimization of Plasma-Based Radar Cross Section Reduction Using Three-Dimensional Computations", IEEE Transactions on Plasma Science, IEEE Service Center, Piscataway, NJ, US, vol. 37, No. 11, Nov. 1, 2009, pp. 2116-2127.
Great Britain Search Report of Great Britain Application No. GB1506199.7, dated Sep. 30, 2015, 4 pages.
European Search Report of European Application No. EP15275181, dated Jan. 28, 2016, 10 pages.
International Search Report and Written Opinion of International Application No. PCT/GB2016/050980, dated Jun. 10, 2016, 15 pages.
Anonymous: "Deflector Shield—Wookieepedia—Wikia", 1999, XP055244465, Retrieved from the internet: URL:http://starwars.wikia.com/wiki/Deflector_shield/Legends.
Great Britain Search Report of Great Britain Application No. GB1506200.3, dated Sep. 30, 2015, 5 pages.
European Search Report of European Application No. EP15275183, dated Jan. 26, 2016, 10 pages.
International Search Report and Written Opinion of International Application No. PCT/GB2016/050873, dated May 31, 2016, 13 pages.
Baris I. Erkmen: "Computational ghost imaging for remote sensing", Hournal of the Optical Society of America A, vol. 29, No. 5, May 1, 2012, pp. 782-6600, XP055219044.
Baoqing Sun et al: "Normalized ghost imaging", Optics Express, vol. 20, No. 15, Jul. 16, 2012, p. 16892, XP055219055.
Great Britain Search Report of Great Britain Application No. GB1506089, dated Sep. 3, 2015, 3 pages.
European Search Report of European Application No. EP15275119, dated Oct. 12, 2015, 7 pages.
International Preliminary Report on Patentability of International Application No. PCTGB2016050873, dated Oct. 19, 2017, 8 pages.
International Preliminary Report on Patentability of International Application No. PCTGB2016050980, dated Oct. 19, 2017, 6 pages.
International Preliminary Report on Patentability of International Application No. PCTGB2016050984, dated Oct. 19, 2017, 10 pages.
International Preliminary Report on Patentability of International Application No. PCTGB20160509673, dated Oct. 19, 2017, 8 pages.
European Search Report of European Application No. EP15275116.0, dated Sep. 17, 2015, 7 pages.
Great Britain Search Report of Great Britain Application No. GB1506085.8, dated Oct. 21, 2015, 3 pages.
PCT Search Report for PCT Application No. PCT/GB2016/051003, dated May 24, 2016, 13 pages.
Berreman, D.W., "A Lens or Light Guide Using Convectively Distorted Thermal Gradients in Gases", Bell System Technical Journal, vol. 43, issue 4, pp. 1469-1475, Jul. 1964.

* cited by examiner

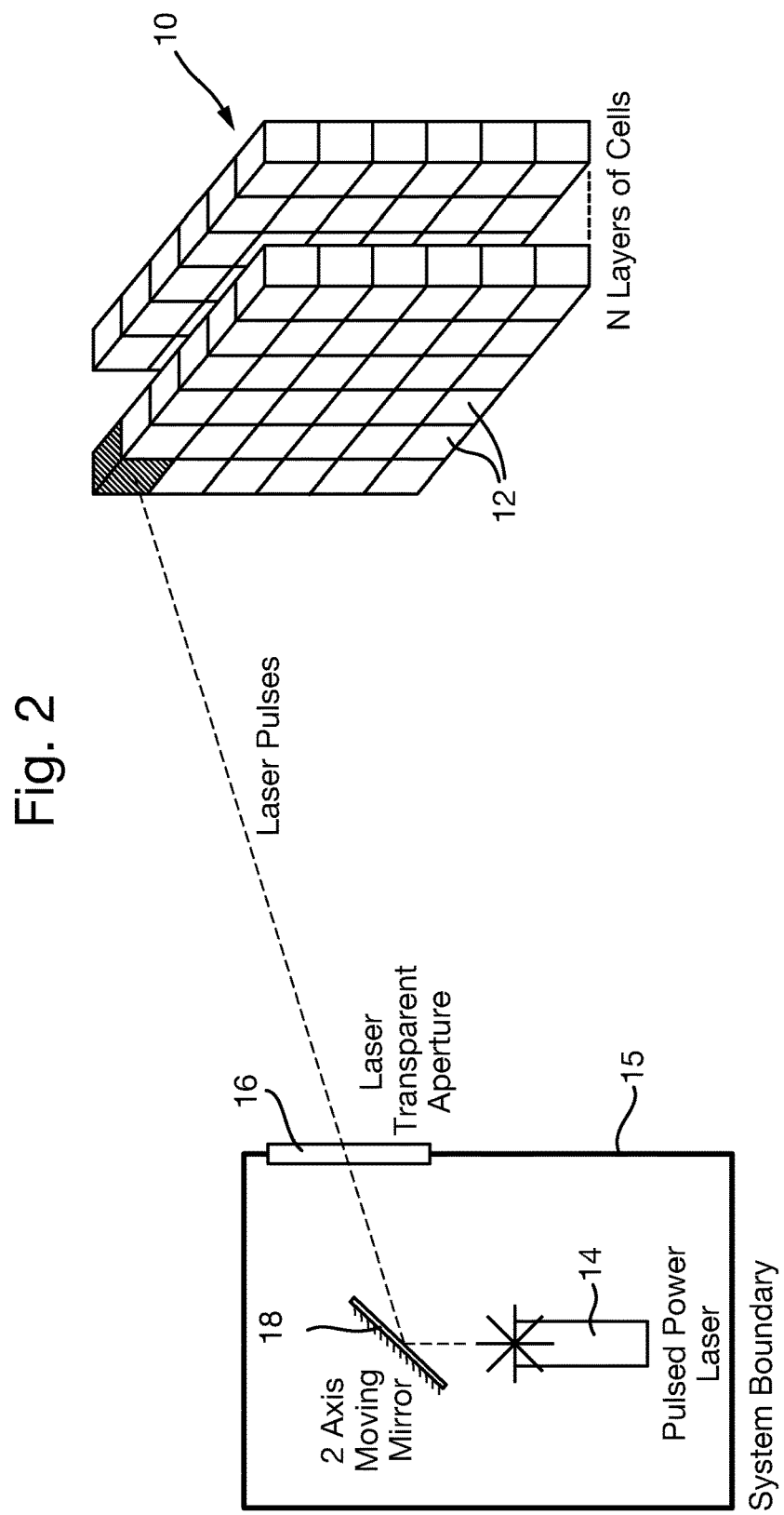

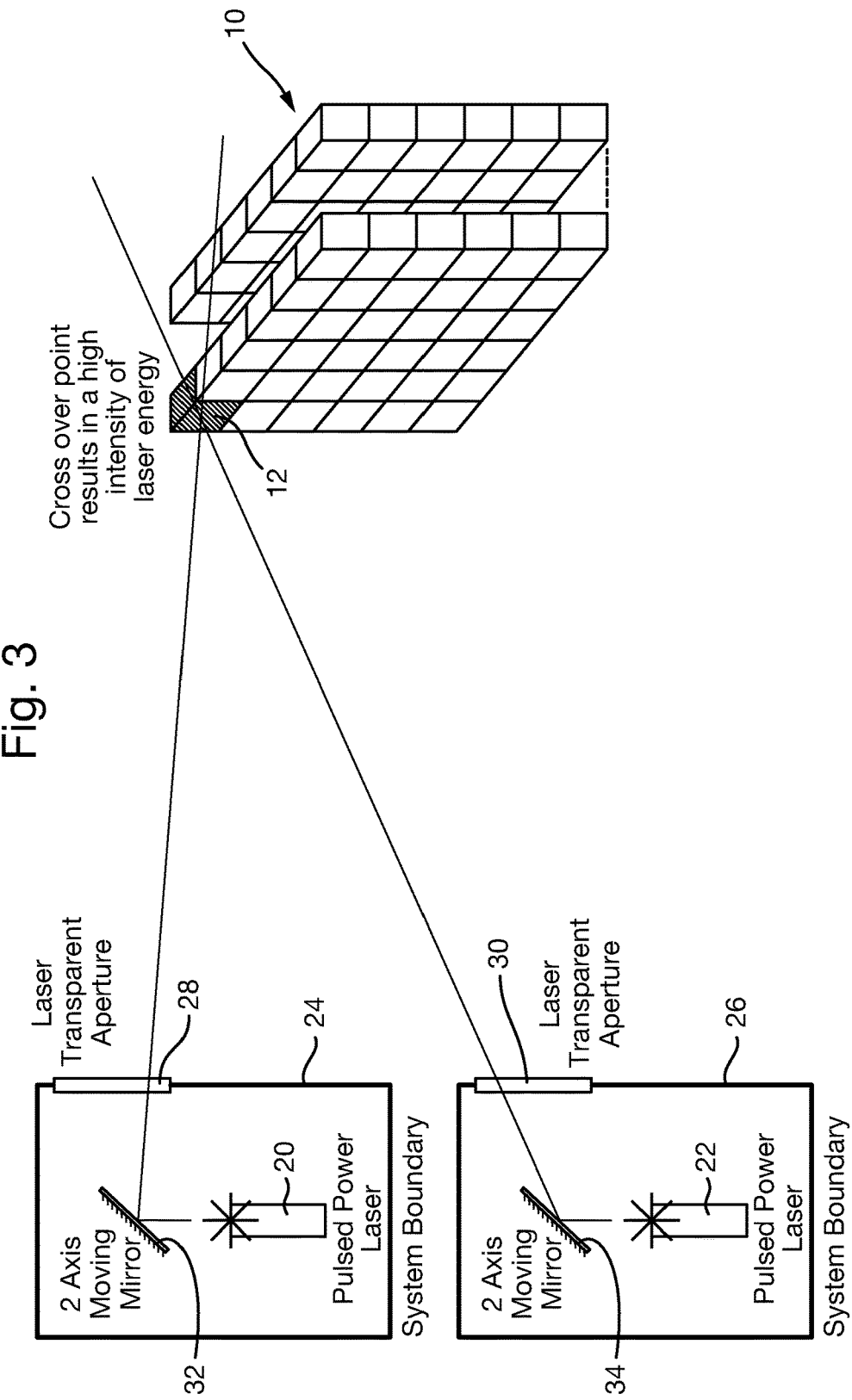

METHOD AND APPARATUS FOR HOLOGRAPHIC IMAGE PROJECTION

RELATED APPLICATIONS

This application is a national phase application filed under 35 USC § 371 of PCT Application No. PCT/GB2016/051003 with an International filing date of Apr. 11, 2016 which claims priority of GB Patent Application 1506085.8 filed Apr. 10, 2015 and EP Patent Application 15275116.0 filed Apr. 10, 2015. Each of these applications is herein incorporated by reference in its entirety for all purposes.

This invention relates generally to a method and apparatus for holographic image projection and, more particularly but not necessarily exclusively, to a method and apparatus for enabling a scanned three-dimensional image to be projected for viewing in three dimensions.

Holography is a technique which enables three-dimensional images (holograms) to be created. The image changes as the position and orientation of the viewing system changes in substantially the same way as if the imaged subject were present, thus making the image appear three-dimensional. A hologram is traditionally generated by using two laser beams: a first, object, beam which is spread using lenses and directed onto a subject or area of interest using mirrors and some of the radiation scattered (reflected) from the subject or area of interest then falls onto a recording medium; and a second, reference, beam, also spread using lenses is directed straight onto the recording medium, without coming into contact with the subject or region of interest. When the two laser beams reach the recording medium, their waves intersect and interfere with each other and it is this interference pattern that is imprinted on the recording medium. If a laser, identical to the one used to record the hologram, is directed onto the developed film, it is diffracted by the interference (surface) pattern on the film and produces a light field identical to the one produced by the subject or region of interest, which produces an image in the viewer's retina.

In more recent years, three-dimensional (3D) image scanning has been developed. In this technology, the scanner projects a low-power, non-damaging laser on a section of an object's surface, each point of the surface touched by the laser is captured by a CCD camera integrated into the scanner, and the X, Y, Z coordinates of the laser intensity of each of these points are recorded. This operation is repeated thousands of times per second to generate a file containing a large amount of point data of the scanned surface. The operation of creating sequential overlapping images from multiple points of view on the surface of the object can be performed until the entire surface of the object (or the entire area of interest) is covered from all viewpoints. In some cases, individual 3D digital images, thus captured, are then aligned together with appropriate software to create an accurate 3D digital model of the object for display on a screen.

However, in other cases, it may be desirable to project the 3D image to another location for viewing. A 3D projector is configured to project a plurality of image signals, each corresponding to an image created using a 3d image scanner, and these image signals can be used to create a three-dimensional holographic image on, for example, a three-dimensional holographic diffuser.

For example, in US2013/0107217, the image signals are directed, by a set of respective mirrors, onto a holographic diffuser from distinct directions such that the 3D image is perceived by a person viewing the holographic diffuser. Any number of such images may be projected, from specific respective directions, onto the holographic diffuser such that the viewer can move around the holographic diffuser and still see the 3D image, 'adjusted' to appear from the viewer's perspective.

However, in order to enable the viewer to see the 3D image effectively from all possible viewpoints relative to the holographic diffuser, a large physical optical system having a large number of optical devices, precisely oriented, is required. This is clearly disadvantageous, especially in locations where space may be an issue, as this requirement results in a relatively large overhead in terms of size, and also cost. Furthermore, such an optical system may be prone to error if any of the optical devices is damaged or moved.

It is, therefore, an object of aspects of the present invention, to address at least some of these issues.

In accordance with an aspect of the present invention, there is provided a holographic projector apparatus comprising an electromagnetic radiation source communicably coupled to a control system and a three dimensional (3D) image projector for outputting a plurality of image signals representative of a generated image, the control system being configured to cause electromagnetic radiation to be applied to a plurality of sets of selected three-dimensional portions of a gaseous volume so as to heat and/or ionise gas within said selected portions of gaseous volume, thereby to generate each set of said selected three-dimensional portions of said gaseous volume such that at least one set of selected three-dimensional portions of said gaseous volume is selectively orientated relative to and arranged to intersect a path of at least one of said image signals, and wherein said selected portions of each selected three dimensional portions are spatially located together in a substantially unbroken three-dimensional configuration and configured to generate an electromagnetic radiation path modifying element for modifying the path of a respective image signal incident thereon to direct said image signal to a selected location within a viewing region for viewing by at least one viewer.

In one exemplary embodiment of the present invention, the atmospheric or gaseous volume may be an unconstrained or in an alternative embodiment an enclosed gaseous or atmospheric volume. Thus, the apparatus of the present invention may comprise a viewing enclosure formed of an optically transparent material through which the image signals, thus directed, can be viewed, depending on the viewpoint of a viewer relative to the enclosure. The electromagnetic radiation path modifying elements generated by each set of selected portions may comprise reflective elements, formed by heating and/or ionising the gas occupied by each of the selected three dimensional portions. In this case, the apparatus may comprise a viewing enclosure formed of an optically transparent material and filled with a gas that is more readily heatable and/or ionisable than air. In either case, the viewing enclosure may be formed of a material that is optically transparent but configured to absorb electromagnetic radiation of higher frequencies, thereby to protect viewers from potential damage by high frequency electromagnetic radiation.

The selected portions may be spatially located together in a substantially unbroken three-dimensional configuration corresponding to the three-dimensional shape of a generated physical electromagnetic radiation modifying element. In another exemplary embodiment of the invention, the selected portions may be configured such that the non-selected portions are in a configuration corresponding to a three-dimensional shape of a generated electromagnetic radiation path modifying device. In yet another exemplary embodiment of the invention, the selected portions may be spatially located together in a three-dimensional configuration corresponding to an annulus having a non-circular cross-section.

The control system may be configured to cause said electromagnetic radiation to be applied to said selected portions so as to heat and/or ionise the air therein and thus change the refractive index thereof. In this case, each modifying element may be operative to generate a radiation converging lens and said selected portions may be spatially located together in a concave lens configuration. Each modifying element may be operative to generate a radiation converging device and the non-selected portions may be spatially located together in a convex lens configuration. Alternatively, each modifying element may operative to generate a radiation diverging device and said selected portions may be spatially located together in a convex lens configuration. In yet another exemplary embodiment, each modifying element may be operative to generate a radiation diverging device and the non-selected portions may be spatially located together in a concave lens configuration.

The electromagnetic radiation source may include a beam steering mechanism for selectively steering a beam of electromagnetic radiation output therefrom, said control system being communicably coupled to said beam steering mechanism and configured to generate signals for steering said beam of electromagnetic radiation relative to said gaseous volume so as to sequentially apply electromagnetic radiation to said selected portions.

Alternatively, or in addition, the apparatus may further comprise a beam splitting module for splitting a beam output from said electromagnetic radiation source into a plurality of paths corresponding to respective locations of selected portions.

The control system may further comprise an modifying element monitoring module for monitoring conditions within the gaseous volume, generating data representative thereof, and transmitting said data to said processor, said processor being further configured to generate adjusted actuation signals configured to adjust at least one characteristic of said electromagnetic radiation so as to compensate for distortion of gas with the gaseous volume.

The control system may further comprise a quality monitoring module for monitoring the performance of each modifying element against a predefined set of desired criteria, and generating signals to dynamically adjust beam steering and/or power of the electromagnetic radiation source so as to reduce or eliminate deviation of the properties and characteristics of the modifying element from that which is defined by the predefined criteria.

In other exemplary embodiments of the invention, each modifying element may be operative to generate a diffractive modifying element and said selected portions define a plurality of three-dimensional shapes, each spatially separated from each other within said gaseous volume. In this case, each modifying element may be operative to generate a diffractive device and said three-dimensional shapes, spatially separated, define a plurality of concentric transmissive and adjacent substantially opaque regions in the form of a zone plate.

Each modifying element may be operative to generate one of a diffractive element, a refractive element, a converging element or a diverging element.

Each modifying element may be operative to generate a reflective device and the method comprises the steps of applying said electromagnetic radiation to said selected portions so as to heat and/or ionise the air therein.

The electromagnetic radiation source may comprise one or more lasers.

In accordance with another aspect of the present invention there is provided a method of projecting a holographic image into a viewing region for viewing by at least one viewer, the method comprising providing an electromagnetic radiation source communicably coupled to a control system and a three dimensional (3D) image projector for outputting a plurality of image signals representative of a generated, and configuring the control system to cause electromagnetic radiation to be applied to a plurality of sets of selected three-dimensional portions of a gaseous volume so as to heat and/or ionise gas within said selected portions of the gaseous volume, wherein each set of selected three-dimensional portions of said gaseous volume is selectively orientated relative to and arranged to intersect a path of at least one of said image signals, and wherein each set of selected three-dimensional portions are spatially located together in a substantially unbroken three-dimensional configuration and configured to generate an electromagnetic radiation path modifying element for modifying a path of a respective image signal incident thereon to direct said image signal to a selected location within said viewing region for viewing by the at least one viewer.

The gaseous volume may be divided into an array of three dimensional portions, and the method comprises the step of sequentially applying said electromagnetic radiation to said selected portions within said array.

Other aspects of the present invention extend to a control system for a holographic projector apparatus substantially as described above, the control system being configured to cause electromagnetic radiation to be applied to a plurality of sets of selected three-dimensional portions of a gaseous volume so as to heat and/or ionise the gas within said selected portions, wherein each set of selected three-dimensional portions of said gaseous volume is arranged to intersect a path of a respective one of said image signals, and wherein said selected portions of each set is spatially located together in a substantially unbroken three-dimensional configuration and configured to generate an electromagnetic radiation path modifying element positioned to intersect at least one image signal and selectively orientated to direct a respective image signal incident thereon to a selected location within a viewing region for viewing by at least one viewer.

These and other aspects of the present invention will be apparent from the following specific description in which embodiments of the present invention are described, by way of examples only, and with reference to the accompanying drawings, in which:

FIG. 2 is a schematic diagram illustrating the manner in which laser power may be applied to selected cells within a matrix in accordance with the principles employed in a first exemplary embodiment of the present invention;

FIG. 3 is a schematic diagram illustrating an alternative manner in which laser power may be applied to selected cells within a matrix in accordance with the principles employed in another exemplary embodiment of the present invention;

Thus, aspects of the present invention operate on the principle of using one or more laser devices to selectively alter the refractive index and/or cause ionisation of portions of a three dimensional volume of the atmosphere or gaseous volume remote from the laser device(s) so as to create or simulate an optical component of a desired size having selected optical properties.

Figure 1:
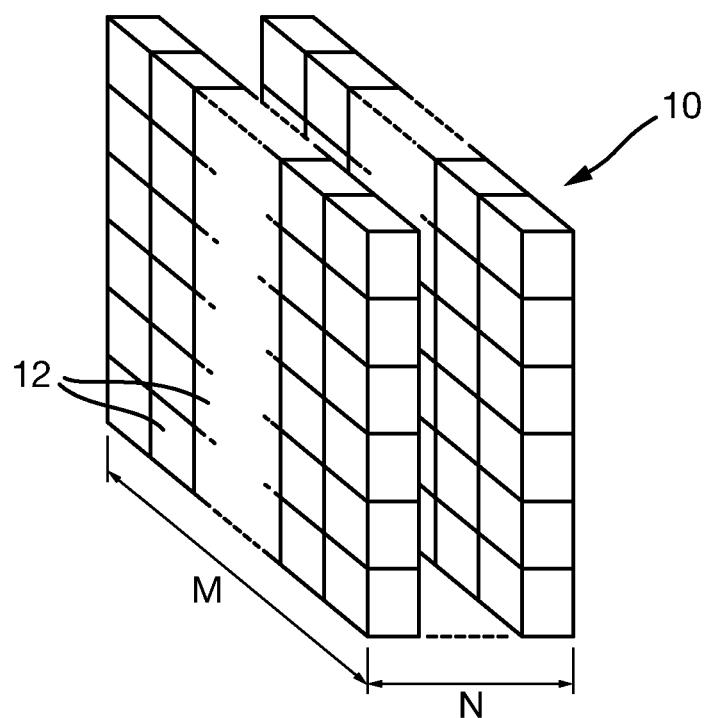
FIG. 1 is a schematic diagram illustrating the concept of an M by N cell matrix for the purposes of defining an atmospheric volume within which an atmospheric EM radiation path modifying component may be created in accordance with the principles employed in an exemplary embodiment of the present invention.

In general, and referring to FIG. 1 of the drawings, the area of the atmosphere in which an EM radiation path modifying component is required to be created can be considered as a cell matrix 10 comprised of M rows and N columns or layers of 'cells' 12, wherein a cell is simply a predefined three-dimensional portion of the matrix. In the example shown, each cell is identical in size and shape, but this is not essential, and the present invention is not necessarily intended to be limited in this regard. It will also be appreciated that the number of cells in the vertical dimension of the cell matrix may vary. Thus, the cell matrix may be of any desired size, shape and number of cells.

Within the matrix 10, the three dimensional structure of an EM radiation path modifying device can be defined in terms of a number of cells 12 in a desired configuration, and it is these cells that will then be targeted by the laser source in order to effect the desired change in their respective properties (either by ionisation or heating to cause a change in refractive index).

It is known that an increase in temperature of a volume of air causes a corresponding decrease in density of that volume of air. As a result, the refractive index of warm air is lower than that of cooler (and therefore denser) air. Thus, some aspects of the present invention operate on the principle that by providing a volume of air that is warmer than the air around it, that volume of air can cause refraction of a beam of electromagnetic radiation as it passes through, in a manner similar to a convergent or divergent lens.

It is also known that if an electric field of a sufficiently high power is applied to a volume of air, the air may be ionised. Ionised air has reflective properties over a range of electromagnetic radiation wavelengths, such properties being a function of density and the type of ionisation created. Thus, some aspects of the present invention operate on the principle that by ionising a volume of air can cause it to reflect a beam of electromagnetic radiation as it hits that volume, in a manner similar to a mirror or similarly reflective device. A mixture of the two principles can be used to create a diffractive element, as will be described in more detail later.

Thus, referring back to FIG. 1 of the drawings, it will be appreciated that by selectively heating or ionising cells 12 within the matrix 10 a three dimensional atmospheric EM radiation path modifying component can be created using a high power electromagnetic radiation source. This may be achieved in a number of different ways. For example, a pulsed power laser (PPL) may be employed, and the 'Kerr' effect exploited therewith in order to attain self focussing of the laser beam at a required point (i.e. within the selected cell). Alternatively, a combination (i.e. crossing over) of two continuous wave (CW) laser beams at a required point may be used to achieve the desired effect. In any event, the laser system(s) is/are configured to selectively heat or ionise the atmosphere, thus changing its refractive index and electromagnetic properties such that electromagnetic energy passing through the heated cells is refracted and/or electromagnetic energy hitting the ionised cells is reflected.

Thus, referring to FIG. 2 of the drawings, apparatus according to one exemplary embodiment of the present invention comprises at least one laser source 14 mounted in an enclosure 15. In the example shown, the laser source 14 is a pulsed power laser source configured to emit high power laser pulses toward the cell matrix 10 via a laser transparent aperture 16. An optically reflective device, i.e. mirror, 18 is mounted on a dual-axis actuator (not shown) in the main laser output path, the actuator being communicably coupled with a control system that is configured to cause the actuator (and, therefore, the mirror 18) to move thereby to selectively direct the laser output through the aperture 16 toward selected cells 12 of the matrix 10. The control system may, for example, be configured to cause the laser output to be scanned across the cell matrix providing a pulse (or more than one pulse) to each selected cell, either via a raster pattern or a pattern optimised to suit the type of atmospheric component required to be created and its operational requirements.

As mentioned briefly above, the laser pulse is self-focussing by means of the 'Kerr' effect, thereby enabling it to deliver enough concentrated power to heat or ionise the cell at which it is directed. The Kerr effect is a change in the refractive index of a material in response to an applied electric field. In the case of a laser pulse of sufficiently high power, its electric field is sufficiently high to change the refractive index of the air. As a result, the cross-sectional area of the pulse (perpendicular to the direction of propagation) can be thought of as shrinking with distance (due to the differences in refractive index), thus bringing the pulse to an intense focus at some point down range of the laser, in this case at the selected cell. This intense focus is of sufficiently high intensity to heat or ionise the cell to change its refractive index and/or other EM radiation path modifying properties. One or more pulses may be provided per cell, dependent upon the desired effect and environmental conditions. It may also be necessary to periodically re-supply laser pulses to all selected cells to maintain the required change in refractive index and/or ionisation for as long as the atmospheric component is required, as once the laser power is removed from a cell, the air therein will very quickly return to its normal (unheated or non-ionised) state.

Referring to FIG. 3 of the drawings, in an alternative exemplary embodiment of the invention, two (or more) CW (continuous wave) laser sources 20, 22 may be provided in respective enclosures 24, 26, each having a laser transparent aperture 28, 30 therein. Once again, each laser system is provided with a mirror 32, 34 mounted on a dual-axis actuator (not shown) communicably coupled to a control system (not shown). Operation of the system is similar, in principle, to that described previously with reference to FIG. 3 of the drawings except, in this case, two (or more) spatially separated CW lasers (which may be mounted on the same platform or across different platforms) are used to selectively heat/ionise the atmosphere in each required cell. This is achieved by ensuring (through pointing) that the laser beams cross over at the same point (in the selected cell 12), thereby ensuring that sufficient power is attained. Such scanning may be performed on the basis of a control system configured to maintain a predetermined spatial separation and orientation between the atmospheric component and the electromagnetic radiation source. However, in an alternative exemplary embodiment, such scanning may be performed using a control system configured to direct the source(s) at specific coordinates corresponding to specific respective locations within the atmosphere.

In yet another exemplary embodiment, and either in addition to the above-mentioned arrangements or alternatively, it is envisaged that a beam splitter could be employed to split a laser beam into numerous new paths corresponding to the configuration of a plurality of respective cells to be targeted. Thus, a plurality of such cells could be targeted simultaneously, without the need for scanning a single laser path across the cell matrix.

In the following, a number of exemplary atmospheric electromagnetic radiation path modifying components that can be created according to the principles employed in respective exemplary embodiments of the present invention will now be described. However, it will be appreciated by a person skilled in the art that the principles set forth herein can be applied in numerous different ways in order to create other types and configurations of electromagnetic (EM) radiation path modifying components and the present invention is not necessarily intended to be limited in this regard.

Figure 4A:
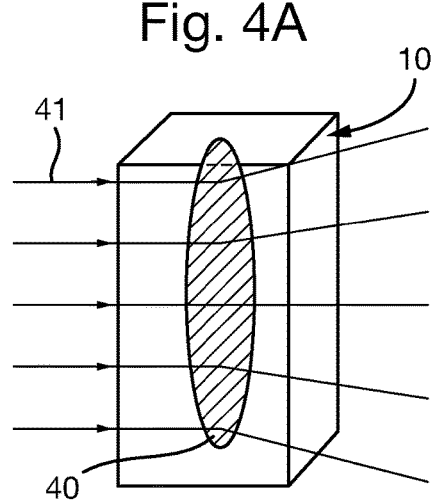
FIG. 4A is a schematic diagram illustrating an atmospheric diverging lens created in accordance with the principles employed in an exemplary embodiment of the present invention.
Figure 4B:
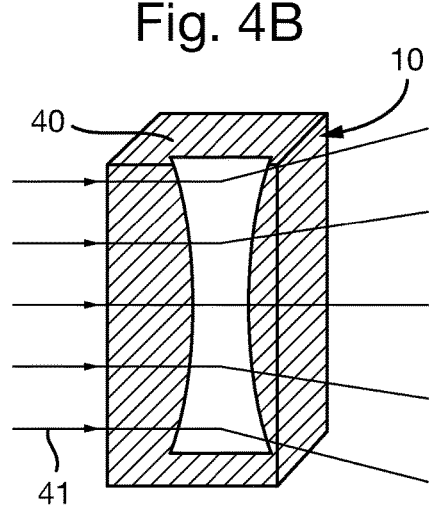
FIG. 4B is a schematic diagram illustrating an alternative atmospheric diverging lens created in accordance with the principles employed in an exemplary embodiment of the present invention.

Referring to FIG. 4A of the drawings, in one of its simplest forms, an exemplary embodiment of the present invention may be employed to create an atmospheric diverging lens. The illustrated lens 40 is of a double convex lens configuration and, in the example shown, has been created generally centrally within the cell matrix 10 with its longitudinal axis in line with the generally central vertical axis of the matrix 10. In order to create the lens 40, the cells corresponding to the three-dimensional 'structure' of a double convex lens are heated, for example using one of the methods described above, thereby to reduce the refractive index of those cells relative to the surrounding cells, and cause the rays of an incoming beam 41 of electromagnetic radiation to be refracted as they enter the component 40 and diverge. For the avoidance of doubt, it will be appreciated that the atmospheric component 40 is a three-dimensional area within the cell matrix comprised of a plurality of atmospheric cells, each of which has been heated in order to attain the required refractive index. A control system and any number of lasers may be employed to ensure that the correct amount of laser power is applied to each cell in order to attain the required level of heating, having regard to environmental factors and the refractive index change required to be achieved. When the component is no longer required, the laser power can simply be removed, and the atmospheric cells will quickly return to their normal state. In an alternative exemplary embodiment, a diverging lens may be created in accordance with an exemplary embodiment of the invention, by heating the cells surrounding a three-dimensional configuration of cells in the shape of a double concave lens (similar in form to that of a conventional diverging lens). Thus, the resultant atmospheric element would comprise a concave lens-shaped region of unheated cells surrounded by a body of heated cells, as shown in FIG. 4B (wherein the shaded area 40 denotes the heated cells and the double concave lens region is unheated).

Figure 5A:
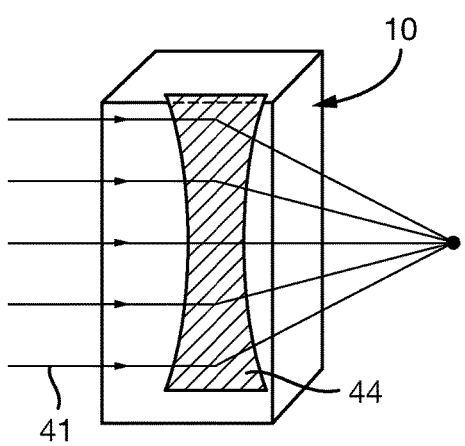
FIG. 5A is a schematic diagram illustrating an atmospheric converging lens created in accordance with the principles employed in an exemplary embodiment of the present invention.
Figure 5B:
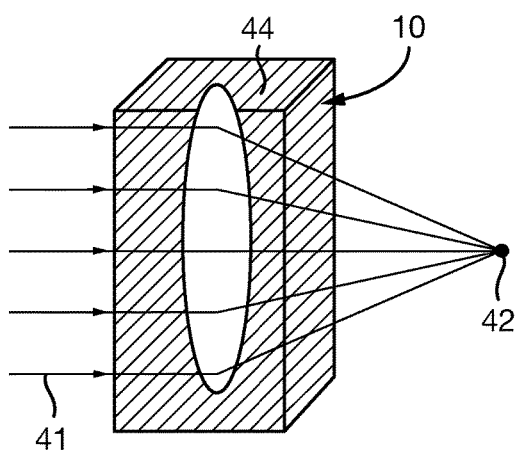
FIG. 5B is a schematic diagram illustrating an alternative atmospheric converging lens created in accordance with the principles employed in an exemplary embodiment of the present invention.

Referring to FIG. 5A of the drawings, an exemplary embodiment of the present invention may be used to create an atmospheric converging lens 44. Thus, in this particular case, the three-dimensional 'structure' represented by the heated cells within the matrix 10 comprises a double concave lens structure, wherein the rays of the incoming beam 41 of electromagnetic radiation are 'bent' or refracted as they enter the atmospheric component 44 and converge to a focal point 42. In an alternative exemplary embodiment, a converging lens may be created by heating the cells surrounding a three-dimensional configuration of cells in the shape of a convex lens (similar in form to that of a conventional converging lens). Thus, the resultant atmospheric element would comprise a convex lens-shaped region of unheated cells surrounded by a body of heated cells, as shown in FIG. 5B of the drawings (wherein the shaded area 44 denotes the heated cells and the double convex lens region is unheated). In yet another exemplary embodiment, the body of heated cells may form an annulus having, for example, a double convex cross-section.

In both cases described above with reference to FIGS. 4A and B and 5A and B of the drawings, the refractive index of the heated cells forming the lens structure is substantially constant, and the differing EM radiation path modifying properties (i.e. converging vs. diverging) are achieved by the geometry of the component. In other words, as with a physical component, it is just the geometry of the three dimensional volume of heated cells (or unheated cells) that defines the function of the resultant lens.

Figure 6:
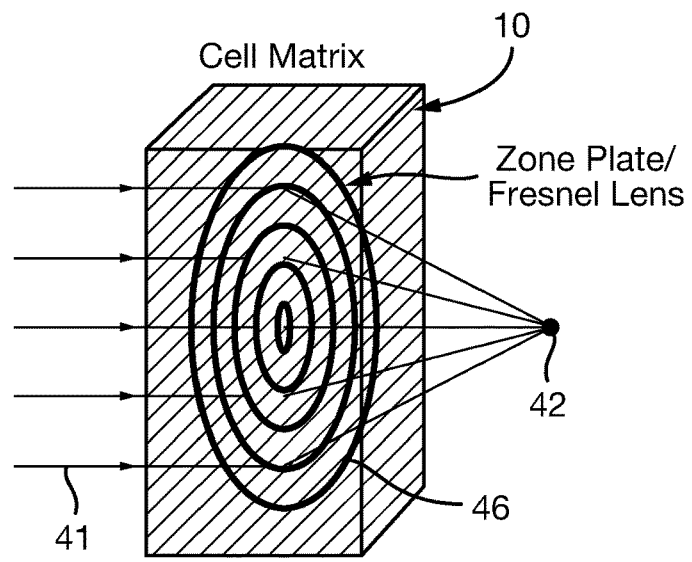
FIG. 6 is a schematic diagram illustrating an atmospheric Fresnel zone plate created in accordance with the principles employed in an exemplary embodiment of the present invention.

Referring now to FIG. 6 of the drawings, in yet another exemplary embodiment of the present invention, diffractive and refractive properties may be combined in order to create more complex atmospheric EM radiation path modifying components. In the illustrated example, a Fresnel zone plate 46 is defined substantially diagonally across the cell matrix 10. The zone plate 46 is formed of concentric rings of heated cells, diametrically separated by unheated cell regions; or it may be formed of concentric rings of ionised (reflective) cells diametrically separated by heated (or unheated) cells (transmissive). The resultant component combines refraction with the diffractive effects from boundaries between regions of significantly different refractive index and/or electromagnetic properties. Thus, it can be seen that more complex EM radiation path modifying components can be created by varying both the geometry and the refractive indices within the atmospheric 'structure'.

Figure 7:
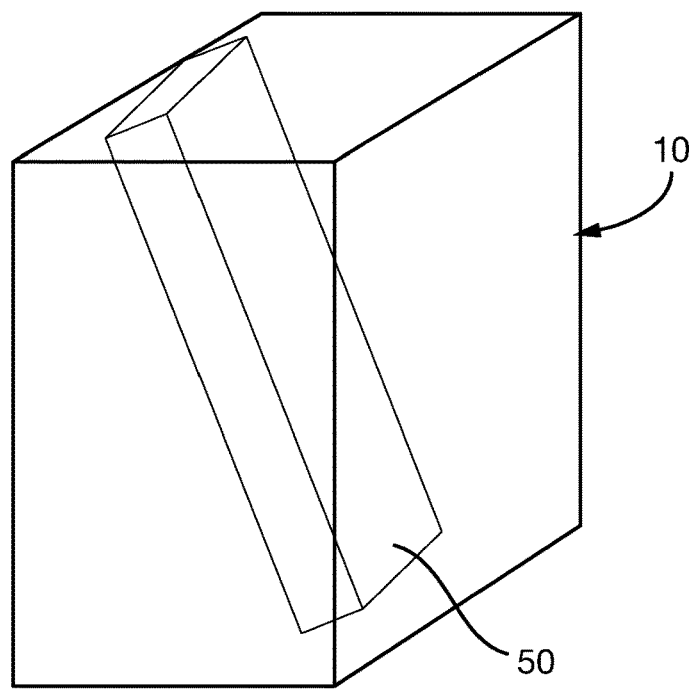
FIG. 7 is a schematic diagram of an atmospheric reflective component created in accordance with the principles employed in an exemplary embodiment of the present invention.

As explained above, it is also possible to simulate reflective components and arrangements in accordance with other exemplary embodiments of the present invention. Thus, referring to FIG. 7 of the drawings, a reflective arrangement is illustrated which comprises a planar reflective atmospheric element 50, configured substantially diagonally across the cell matrix 10.

The atmospheric reflective component 50 is formed by ionisation of selected cells (in a configuration matching the required 'structure' and orientation of the component within the cell matrix 10). In use, an incoming beam 54, such as an image signal, for example, hits the reflective component 50 and is reflected back at an angle dictated by the orientation of the atmospheric component 50.

In the examples illustrated, the cell matrix 10 is 'upright' and the orientation of the atmospheric element(s) is achieved by the pattern of the ionised/heated cells. However, it will be appreciated that, in alternative exemplary embodiments of the invention, the cell matrix itself may be oriented to match the required orientation of the atmospheric EM radiation path modifying element and, in this case, the populated cell pattern (relative to the cell matrix) will always be the same for a particular atmospheric element of a specified size. Also, it will be appreciated that a more 'curved' profile of the atmospheric components thus created may be achieved by varying the degree of heating/ionisation in the peripheral populated cells.

Figure 8:
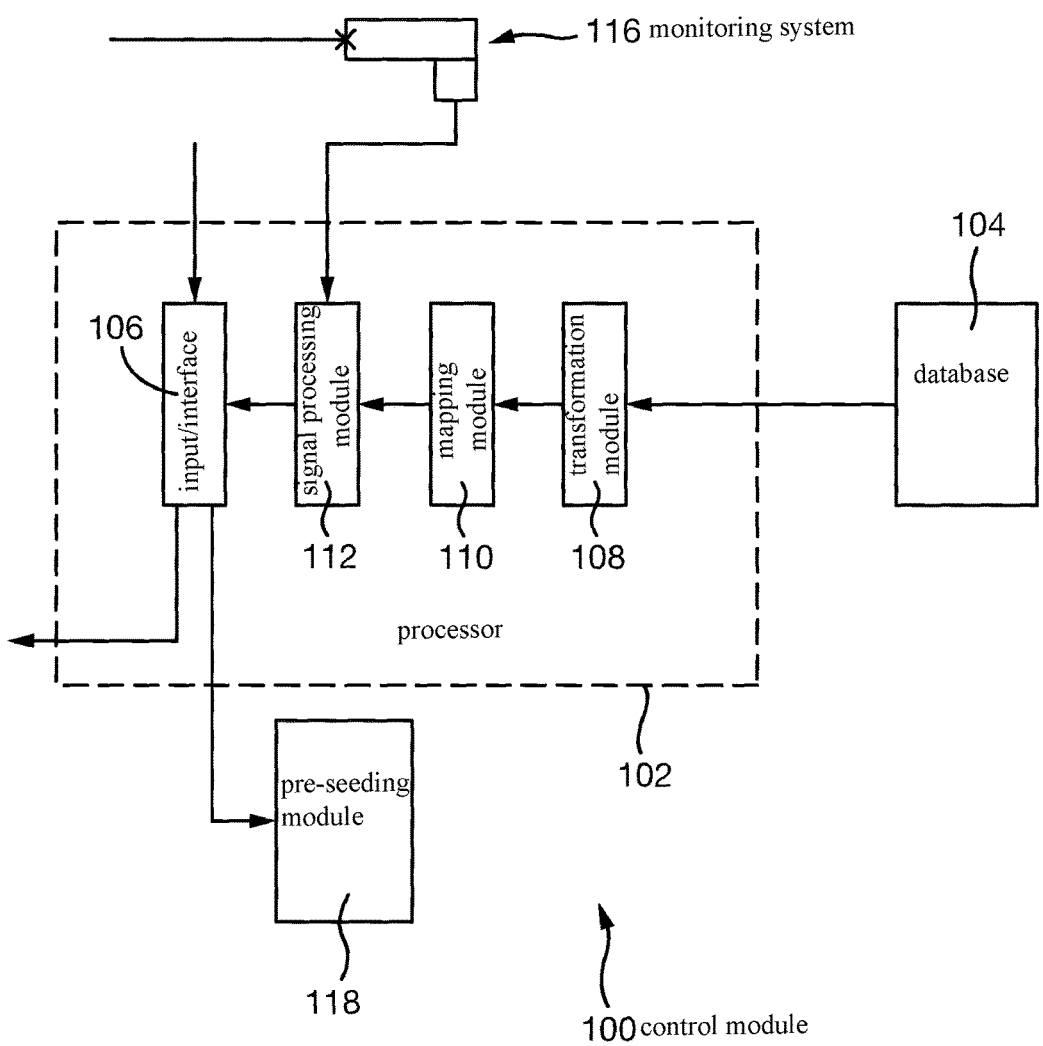
FIG. 8 is a schematic block diagram illustrating apparatus for creating a set of atmospheric EM radiation path modifying components for use in an exemplary embodiment of the present invention.
Figure 9A:
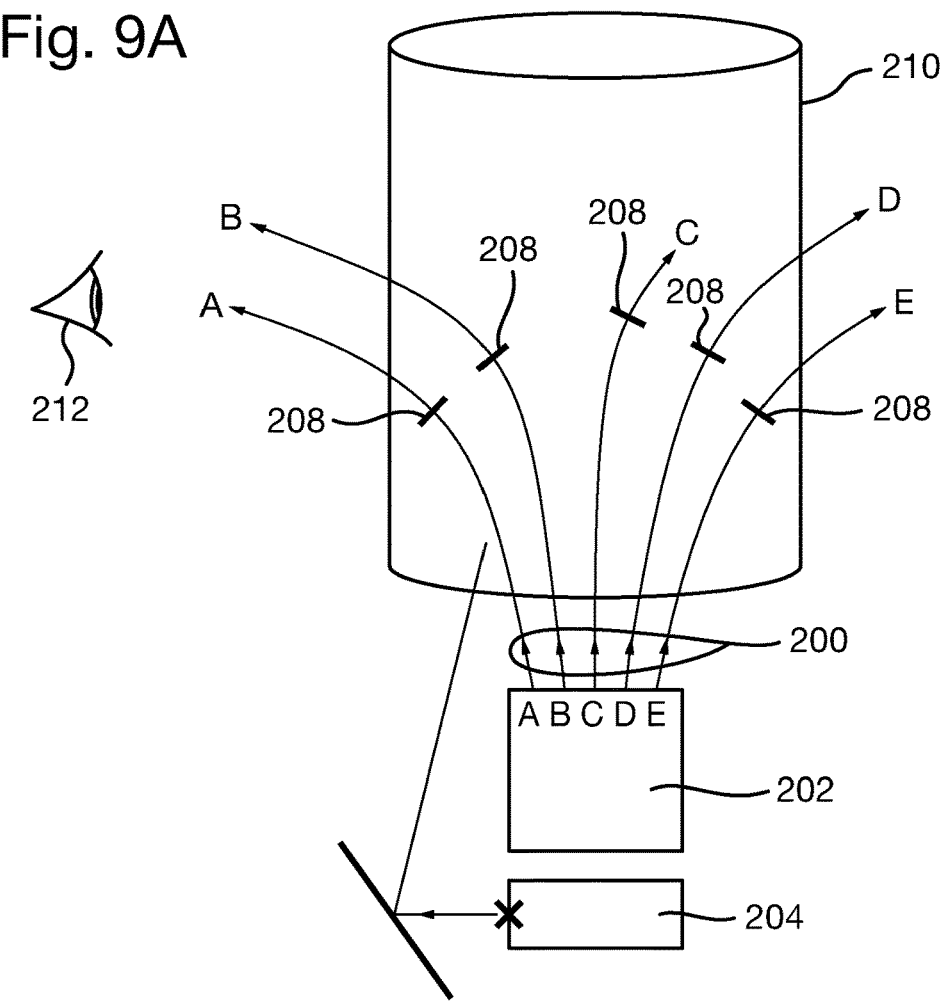
FIGS. 9A and 9B are schematic side and plan views of a holographic projector apparatus according to an exemplary embodiment of the present invention.
Figure 9B:
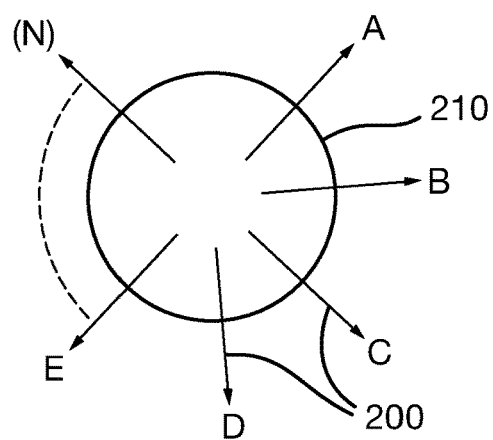

Referring to FIG. 8 of the drawings, an apparatus in accordance with an exemplary embodiment of the present invention for creating an atmospheric EM radiation path modifying arrangement comprises a control module 100 communicably coupled to, for example, a dual-axis actuator on which a reflective component is mounted within a laser system such as that described above with reference to FIGS. 2 and 3 of the drawings. Such a laser system may, for example, be mounted in or relative to a viewing enclosure (not shown).

The control module 100 comprises a processor 102 communicably coupled to a database 104. The database has stored therein data representative of one or more cell matrices, representative of respective atmospheric volumes, and the cells therein that need to be 'populated' (i.e. heated or ionised) in order to construct a set of respective three-dimensional atmospheric EM radiation path modifying elements of which the arrangement is comprised. Such data may also include information as to the degree of ionisation/heating required to be maintained in order to achieve the required EM radiation path modifying characteristics of the elements. It will be appreciated that the database may simply include a single 'template' or populated cell matrix, bespoke to the platform or application in which the respective atmospheric elements are to be used. However, in alternative exemplary embodiments, the database may include a plurality of different such templates from which a required atmospheric component can be selected for use, as required.

The processor 102 includes an input and an interface 106 for receiving an actuation signal indicative that an atmospheric component is required to be created, together with data representative of the size and orientation of the required component, and data representative of the position and orientation of the atmospheric component relative to the platform on which the apparatus is mounted, the electromagnetic radiation path to be modified and/or the laser source used to create the atmospheric component. The actuation signal and accompanying data may be manually entered by an operative (i.e. may be generated as part of a switching mechanism for switching a holographic projector on).

The processor 102, in response to the actuation signal, searches the database 104 for the populated cell matrix data corresponding to the atmospheric component required to be created, and retrieves the associated data. A transformation module 108 is provided, which transforms the matrix cell data onto data representative of each real atmospheric matrix cell within which an EM radiation path modifying component is to be created, both in terms of size and orientation thereof, and determines precise coordinates for the location of each real atmospheric cell relative to the corresponding respective cell of the stored matrix (and also relative to the platform on which the apparatus is mounted, the electromagnetic source to be modified and/or the laser source used to create the atmospheric component), and a mapping module 110 maps the respective population data from the stored cell matrix onto the data representative of the real atmospheric cell matrix accordingly. Of course, in a fixed system, the coordinates of the cell matrix or matrices and individual cells therein may be hard coded, and do not need to be repeatedly supplied to the processor as part of the actuation signals. Either way, the processor now knows the precise physical location of each cell in the real atmospheric cell matrix and the cell 'population' pattern required to create the atmospheric component. Finally, such data is converted, by a signal processing module 112, into a scanning pattern comprised of a pattern of actuation signals configured to move and actuate the laser beam(s) in order to selectively heat/ionise each real atmospheric cell matrix in the required pattern (and to the required degree) to create the three-dimensional atmospheric elements. In other words, the actuation signals are configured to control the power and beam steering of the laser source(s) to heat/ionise each selected cell as required.

Furthermore, an atmospheric component monitoring system 116 may be provided within, or communicably coupled to, the control module 100. The atmospheric component monitoring system 116 may, for example, comprise a low power laser of a suitable wavelength (as will be apparent to a person skilled in the art) to detect atmospheric effects. Thus, the monitoring system 116 may form part of a feedback loop with the signal processing module 112 to enable the actuation signals to be adjusted to compensate for atmospheric distortion. In alternative exemplary embodiments, the apparatus may comprise a quality monitoring module for monitoring the performance (i.e. the properties and characteristics) of the atmospheric element against a predefined set of desired criteria, and generating signals to dynamically adjust beam steering and/or power of the electromagnetic radiation source so as to reduce or eliminate deviation of the properties and characteristics of the atmospheric element from that which is defined by the predefined criteria. Such deviation may be caused by atmospheric distortion or otherwise. In other words, successive and/or continuous 'fine tuning' of the atmospheric elements is facilitated to create and maintain an atmospheric element having consistently desired characteristics and quality.

In one exemplary embodiment of the present invention, the apparatus may further comprise a pre-seeding module 118. The pre-seeding module 118 may comprise a tank or receptacle containing particulate material, such as metal powder or plastic particles, which tend to be more readily ionised by laser power than air. Suitable materials for this purpose will be apparent to a person skilled in the art. The pre-seeding module 118 will also include a propelling mechanism for propelling the particulate material into a defined atmospheric cell matrix, the propelling mechanism being communicably coupled to the signal processing module 112. In use, if a reflective atmospheric component is required to be created, the initial actuation signal may be configured to operate the propelling mechanism and cause a quantity of the particulate material to be sprayed into the defined atmospheric volume corresponding to the cell matrix, before selective ionisation of the individual cells. As the particulate material is more readily ionised than air, it may be possible to create the required reflective atmospheric component using a lower power laser than would otherwise be required. In alternative exemplary embodiments, the atmospheric components may be created within an optically transparent enclosure, such as a cylinder or an inverted 'bell' shaped enclosure, for example. The enclosure may be filled with, or contain, a gas other than air which is more readily ionisable than air, and examples thereof will be apparent to a person skilled in the art. Furthermore, for safety purposes, the enclosure may be formed of an optically transmissive material that is configured to absorb higher frequency electromagnetic radiation.

Referring to FIGS. 9A and 9B of the drawings, in a holographic projector system according to an exemplary embodiment of the present invention, a plurality of image signals 200 is output by a 3D image projector 202, wherein the image signals are spatially and/or angularly separated from each other. The projector comprises at least one laser source 204 communicably coupled to a control system, for creating a plurality of optical elements 208 in the manner described above.

Each of the optical elements, in this case, comprises a diverging element, which is formed by heating selected cells in respective atmospheric matrices, to diverging lenses of the type described above, each being oriented to capture a single image signal and diverge or 'bend' the signal toward a specified location within a viewing enclosure 210. Thus, each of the image signals is bent or diverged to a different location within the viewing enclosure 210, dependent on the image viewpoint to which the respective image signal relates. Thus, as a viewer 212 moves around the enclosure 210, a different image signal is received in their retina, and a three dimensional image of the subject is thus perceived.

In an alternative exemplary embodiment, the atmospheric optical elements provided in respect of each of the image signals may, for example, comprise reflective elements, created by ionising respective three-dimensional volumes of the cell matrices. In this case, when each respective image signal hits an atmospheric component, it is reflected toward the required location within the viewing enclosure.

It will be appreciated by a person skilled in the art from the foregoing description that modifications and variations can be made to the described embodiments without departing from the scope of the invention as defined by the appended claims. Indeed, it will be appreciated that numerous variations are possible in terms of the shape and configuration of the three dimensional heated/ionised cell combinations in order to define any desired atmospheric EM radiation path modifying component. Furthermore, combinations of heating and ionisations can be used within a single cell matrix in order to realise more complex component configurations.

The invention claimed is:

1. A holographic projector apparatus comprising an electromagnetic radiation source communicably coupled to a control system and a three dimensional image projector for outputting a plurality of image signals representative of a generated image, the control system being configured to cause electromagnetic radiation to be applied to a plurality of sets of selected three-dimensional portions of a gaseous volume so as to heat and/or ionise gas within said selected portions of the gaseous volume, thereby to generate each set of selected three-dimensional portions of said gaseous volume such that at least one set of said selected three-dimensional portions of said gaseous volume is selectively orientated relative to and arranged to intersect a path of at least one of said image signals, and wherein said selected portions of each set of selected three-dimensional portions are spatially located together in a substantially unbroken three-dimensional configuration and configured to generate an electromagnetic radiation path modifying element for modifying the path of a respective image signal incident thereon to direct said image signal to a selected location within a viewing region for viewing by at least one viewer.

2. The apparatus according to claim 1, wherein the selected portions of each set are spatially located together in a substantially unbroken three-dimensional configuration corresponding to the three-dimensional shape of a generated electromagnetic radiation modifying element.

3. The apparatus according to claim 2, wherein the electromagnetic radiation path modifying elements generated by each set of selected portions comprise reflective elements, formed by heating and/or ionising the gas occupied by each of the selected three dimensional portions.

4. The apparatus according to claim 1, wherein the selected portions of each set are configured such that the non-selected portions are in a configuration corresponding to a three-dimensional shape of a generated electromagnetic radiation path modifying element.

5. The apparatus according to claim 1, wherein the control system is configured to cause said electromagnetic radiation to be applied to said selected portions so as to heat and/or ionise the air therein and thus change the refractive index thereof.

6. The apparatus according to claim 1, wherein the electromagnetic radiation source includes a beam steering mechanism for selectively steering a beam of electromagnetic radiation output therefrom, said control system being communicably coupled to said beam steering mechanism and configured to generate signals for steering said beam of electromagnetic radiation relative to said gaseous volume so as to sequentially apply electromagnetic radiation to said selected portions.

7. The apparatus according to claim 1, further comprising a beam splitting module for splitting a beam output from said electromagnetic radiation source into a plurality of paths corresponding to respective locations of selected portions.

8. The apparatus according to claim 1, wherein the control system further comprises modifying element monitoring module for monitoring conditions within the gaseous volume, generating data representative thereof, and transmitting said data to a processor, the processor being configured to generate adjustment signals configured to adjust at least one characteristic of said electromagnetic radiation so as to compensate for distortion of gas within the gaseous volume.

9. The apparatus according to claim 1, wherein the control system further comprises a quality monitoring module for monitoring the performance of each modifying element against a predefined set of desired criteria, and generating signals to dynamically adjust beam steering and/or power of the electromagnetic radiation source so as to reduce or eliminate deviation of the properties and characteristics of the modifying elements from that which is defined by the predefined criteria.

10. The apparatus according to claim 1, wherein each modifying element is operative to generate a diffractive modifying element and said selected portions of each set define a plurality of three-dimensional shapes, each spatially separated from each other within said gaseous volume.

11. The apparatus according to claim 1, wherein each modifying element is operative to generate one of a diffractive element, a refractive element, a converging element or a diverging element.

12. The apparatus according to claim 1, wherein the electromagnetic radiation source comprises one or more lasers.

13. A control system for a holographic projector apparatus according to claim 1, the control system being configured to cause electromagnetic radiation to be applied to a plurality of sets of selected three-dimensional portions of a gaseous volume so as to heat and/or ionise the gas within said selected portions, wherein each set of selected three-dimensional portions of said gaseous volume is arranged to intersect a path of a respective one of said image signals, and wherein said selected portions of each set is spatially located together in a substantially unbroken three-dimensional configuration and configured to generate an electromagnetic radiation path modifying element positioned to intersect at least one image signal and selectively orientated to direct a respective image signal incident thereon to a selected location within a viewing region for viewing by at least one viewer.

14. A method of projecting a holographic image into a viewing region for viewing by at least one viewer, the method comprising providing an electromagnetic radiation source communicably coupled to a control system and a three dimensional image projector for outputting a plurality of image signals representative of a generated image, and configuring the control system to cause electromagnetic radiation to be applied to a plurality of sets of selected three-dimensional portions of a gaseous volume so as to heat and/or ionise gas within said selected portions of the gaseous volume, wherein each set of selected three-dimensional portions of said gaseous volume is selectively orientated relative to and arranged to intersect a path of at least one of said image signals, and wherein each set of selected three-dimensional portions are spatially located together in a substantially unbroken three-dimensional configuration and configured to generate an electromagnetic radiation path modifying element for modifying the path of a respective image signal incident thereon to direct said image signal to a selected location within said viewing region for viewing by the at least one viewer.

15. The method according to claim 14, wherein the gaseous volume is divided into an array of three dimensional portions, and the method comprises sequentially applying said electromagnetic radiation to said selected portions within said array.

* * * * *